US007624260B2

(12) United States Patent
Ethier et al.

(10) Patent No.: US 7,624,260 B2
(45) Date of Patent: Nov. 24, 2009

(54) SYSTEM EXECUTING A FAST BOOT WAKE-UP

(75) Inventors: Sheridan Ethier, Kanata (CA); Randy Martin, Smith Falls (CA); Colin Burgess, Ottawa (CA); Brian Stecher, Kanata (CA)

(73) Assignee: QNX Software Systems GmbH & Co. KG, Karlsbad (DE)

( * ) Notice: Subject to any disclaimer, the term of this patent is extended or adjusted under 35 U.S.C. 154(b) by 610 days.

(21) Appl. No.: 11/418,481

(22) Filed: May 4, 2006

(65) Prior Publication Data

US 2007/0260867 A1  Nov. 8, 2007

(51) Int. Cl.
*G06F 9/00* (2006.01)
*G06F 15/177* (2006.01)
(52) U.S. Cl. .............................. 713/2; 713/1; 713/300; 713/320; 713/324; 714/5; 714/21; 714/36; 714/42; 714/100
(58) Field of Classification Search ..................... 713/1, 713/2, 300, 320, 324; 714/5, 21, 36, 42, 714/100
See application file for complete search history.

(56) References Cited

U.S. PATENT DOCUMENTS

| 5,675,795 | A | 10/1997 | Rawson, III et al. | |
|---|---|---|---|---|
| 5,935,242 | A * | 8/1999 | Madany et al. | 713/1 |
| 6,389,556 | B1 | 5/2002 | Qureshi | |
| 6,625,754 | B1 * | 9/2003 | Aguilar et al. | 714/15 |
| 6,691,234 | B1 | 2/2004 | Huff | |
| 6,711,675 | B1 * | 3/2004 | Spiegel et al. | 713/2 |

(Continued)

FOREIGN PATENT DOCUMENTS

GB 2411982 A 9/2005

(Continued)

*Primary Examiner*—Thomas Lee
*Assistant Examiner*—Jaweed A Abbaszadeh
(74) *Attorney, Agent, or Firm*—Brinks Hofer Gilson & Lione (57) ABSTRACT

A processing system is set forth that includes a processor, read only memory storing an operating system image file accessible by the processor, and random access memory that is also accessible by the processor. The processing system also includes a boot program that is executable by the processor to initialize the processing system in response, for example, to a power-on event, reset event, or a wake-up event. A power-on event occurs when power is initially provided to the processing system while a wake-up event occurs when the processing system is to exit a low-power mode of operation. A reset event occurs when, for example, a fault is detected that causes the system to restart. The boot program selectively performs a full boot copy of the operating system image file from the read only memory to the random access memory or a fast boot copy of only predetermined portions of the operating system image file from the read only memory to the random access memory. For example, the boot program may execute the full boot copy operation in response to the power-on event and the fast boot copy operation in response to the wake-up event and/or reset event. Further, the boot program may limit execution of the fast boot copy operation to those instances in which the random access memory passes an integrity check of the contents of one or more areas containing selected portions of the operating system copied from the read only memory during a prior full boot copy operation.

18 Claims, 9 Drawing Sheets

U.S. PATENT DOCUMENTS

| | | | |
|---|---|---|---|
| 6,904,535 B2 * | 6/2005 | Yamada et al. | 713/324 |
| 6,965,989 B1 * | 11/2005 | Strange et al. | 713/1 |
| 7,000,075 B2 | 2/2006 | Beckert et al. | |
| 7,036,040 B2 | 4/2006 | Nicholson et al. | |
| 7,051,160 B2 | 5/2006 | Beckert et al. | |
| 7,051,326 B2 | 5/2006 | Goodman | |
| 7,395,421 B1 * | 7/2008 | Nowlin | 713/2 |
| 7,480,791 B2 * | 1/2009 | Rothman et al. | 713/1 |
| 2002/0023237 A1 * | 2/2002 | Yamada et al. | 713/323 |
| 2002/0073358 A1 | 6/2002 | Atkinson | |
| 2004/0093489 A1 | 5/2004 | Hsu | |
| 2004/0107359 A1 * | 6/2004 | Kawano et al. | 713/200 |
| 2004/0143696 A1 | 7/2004 | Hsieh | |
| 2004/0260919 A1 | 12/2004 | Takahashi | |
| 2005/0083761 A1 * | 4/2005 | Ginosar | 365/222 |
| 2005/0216722 A1 * | 9/2005 | Kim et al. | 713/2 |
| 2005/0229042 A1 | 10/2005 | Crowell et al. | |
| 2005/0246518 A1 * | 11/2005 | Takahashi | 713/2 |
| 2006/0195658 A1 * | 8/2006 | Kanbe et al. | 711/114 |
| 2006/0265579 A1 * | 11/2006 | Seol | 713/1 |
| 2006/0277400 A1 * | 12/2006 | Veen et al. | 713/1 |
| 2006/0282654 A1 * | 12/2006 | Veen et al. | 713/1 |
| 2007/0083743 A1 * | 4/2007 | Tsang | 713/1 |
| 2007/0260868 A1 * | 11/2007 | Azzarello et al. | 713/2 |

FOREIGN PATENT DOCUMENTS

WO  WO 2005/013125 A1  2/2005

* cited by examiner

SYSTEM EXECUTING A FAST BOOT WAKE-UP

BACKGROUND OF THE INVENTION

1. Technical Field

The present invention is generally directed to a processing system that executes a fast boot wake-up. More particularly, the present invention may execute the fast boot wake-up operation through selective copying of an image filesystem during system boot.

2. Related Art

Processing systems, such as embedded systems, are widely used in both consumer and commercial applications. Many applications, such as those involved in automotive telematics systems, impose significant constraints on the operation of the processing system. Constraints imposed on system power consumption may require that the system operate in a low-power mode. System response time constraints may require minimization of the system startup time and/or wake-up time.

It is often difficult to design a processing system that adequately balances power constraints and response time constraints with one another. Each time that the system enters a low-power mode (as dictated by the power constraints), it must execute a wake-up operation before it is ready to respond to various system events. The duration of the wake-up operation, however, should fall within the bounds of the response time constraints imposed on the system.

If the processor has been powered off during the low-power mode, the wake-up operation includes a complete reboot of the processing system. A complete reboot can be quite time consuming, particularly in embedded systems that employ an image filesystem. In such embedded systems, a complete copy of the image filesystem is transferred from read only memory to random access memory, where it is used by the processor. The image filesystem may contain the operating system for the embedded system, the executable programs used in the embedded system, and/or any data files that might be related to the programs. Consequently, it may be quite large and require a substantial amount of time and processing power to execute the transfer. During the transfer, the processing system is typically not responsive to most of the events that the system is designed to handle. The response time of the system is therefore impacted by the duration of the transfer.

Attempts have been made to design a processing system having a low-power mode from which a fast system recovery can be made. Most such attempts have involved driving the processor into a hibernation mode. However, even in the hibernation mode, the processor may place a substantial drain on the system power supply, thereby exceeding the power consumption constraints. Further, a significant amount of programming code may be required to properly implement this type of system. An improved system in which both a fast boot wake-up and a low-power mode are realized is therefore desirable. Further, an improved system in which a fast boot wake-up in response to other system events is desirable.

SUMMARY

A processing system is set forth that includes a processor, read only memory storing an operating system image file accessible by the processor, and random access memory that is also accessible by the processor. The processing system also includes a boot program that is executable by the processor to initialize the processing system in response, for example, to a power-on event, reset event, or a wake-up event. A power-on event occurs when power is initially provided to the processing system while a wake-up event occurs when the processing system is to exit a low-power mode of operation. A reset event occurs when, for example, a fault is detected that causes the system to restart. The boot program selectively performs a full boot copy of the operating system image file from the read only memory to the random access memory or a fast boot copy of only predetermined portions of the operating system image file from the read only memory to the random access memory. For example, the boot program may execute the full boot copy operation in response to the power-on event and the fast boot copy operation in response to the wake-up event and/or reset event. Further, the boot program may limit execution of the fast boot copy operation to those instances in which the random access memory passes an integrity check of the contents of one or more areas containing selected portions of the operating system copied from the read only memory during a prior full boot copy operation.

In one example, the boot program includes an initial program loader that is stored at a start location in read only memory corresponding to a reset vector of the processor. The initial program loader is executable by the processor from the read only memory beginning at this start location. The boot program also includes a startup program loaded into the random access memory by the initial program loader where it is executed by the processor.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
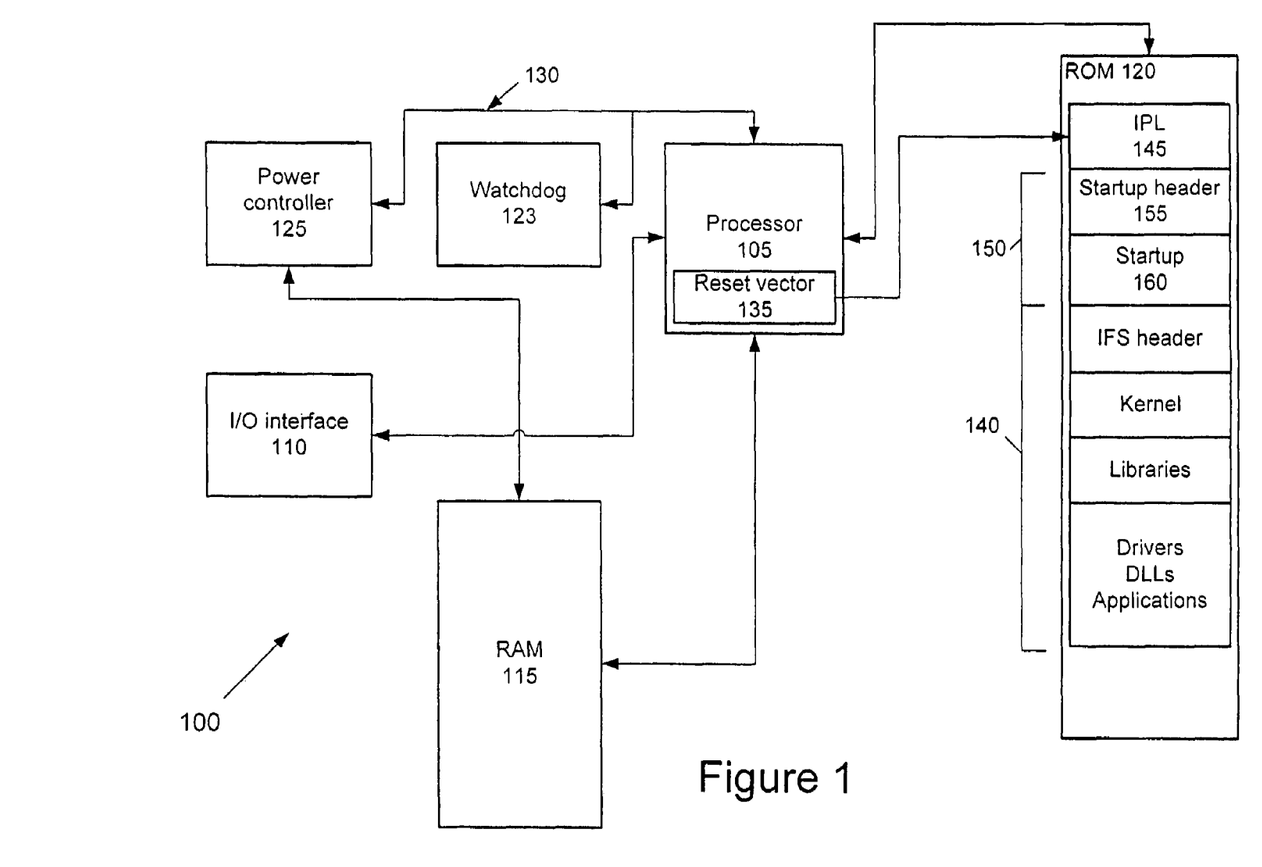
FIG. 1 is a block diagram of the basic components of an exemplary system that may be used to implement a fast boot wake-up from a low-power mode and/or system reset.

FIG. 1 is a block diagram of the basic components of an exemplary system that may be used to implement a fast boot wake-up from a low-power mode. The system 100 includes a processor 105 that may access an I/O interface 110, random access memory 115, and read only memory 120. The I/O interface 110 allows the processor 105 to interact with one or more peripheral components. The peripheral components may be separate from and/or integrated with the components of the I/O interface 110. Random access memory 115 may be implemented in a variety of different manners including, for example, implementations using one or more dynamic random access memory technologies. In one implementation, memory 115 is realized using one or more dynamic random access memory units that may be directed into a self-refresh mode of operation. Likewise, read only memory 120 may be implemented in a variety of different manners including, for example, implementations using one or more flash memory technologies.

Processor 105 also may be connected to receive and control a watchdog timer 123. Watchdog timer 123 may be used to reset the processor 105 in the event of a system fault. For example, when the processor 105 temporarily malfunctions, it will discontinue periodic communications with the watchdog timer 123. This disruption in the periodic communications will cause the watchdog timer 123 to issue one or more reset signals to the processor 105 along, for example, one or more signal lines 130.

System 100 also includes a power controller 125 that may receive power control commands either directly or indirectly from the processor 105. Additionally, or alternatively, the power controller 125 may receive power control signals from an external source, such as another power supply, a peripheral component, a switch, or the like. The power controller 125 responds to these power commands and/or power control signals to direct the system 100 into a low-power mode and to wake-up from the low-power mode. Additional functionality may be associated with power controller 125 to directing the system 100 through an initial power-up operation. An initial power-up operation takes place when power is provided to the system 100 after the system has been completely turned off. A reset signal is provided from the power controller 125 to the processor 105 along one or more signal lines 130. In the illustrated system, watchdog timer 123 may also issue a reset signal along the same signal lines. The reset signal goes to an active state in response to a system wake-up event and, further, may be activated in response to an initial power-up event. Processor 105 responds to the occurrence of the active reset signal by attempting to execute assembly language code that is stored at a memory location identified by reset vector 135.

The operating system that is utilized by system 100 may be selected with deference to the particular application of the processing system. For example, embedded applications may use the Neutrino® operating system available from QNX Software Systems, or a similar operating system. In such embedded applications, the operating system is embodied in an image filesystem 140 that is stored in read only memory 120. The image filesystem 140 may contain the operating system for the system 100, the executable programs used in the system 100, and/or any data files that might be related to the programs. It also may contain a small directory structure that identifies the names and positions of the files contained within it for reference by the kernel of the operating system.

In the example shown in FIG. 1, read only memory 120 also includes further program code. More particularly, read only memory 120 includes a boot program that is used to initialize the system 100. In this example, the boot program includes an initial program loader 145 and a startup program 150. The initial program loader 145 has a start location corresponding to the reset vector 135. The startup program 150 may include a startup header 155 and corresponding program code 160.

Figure 2:
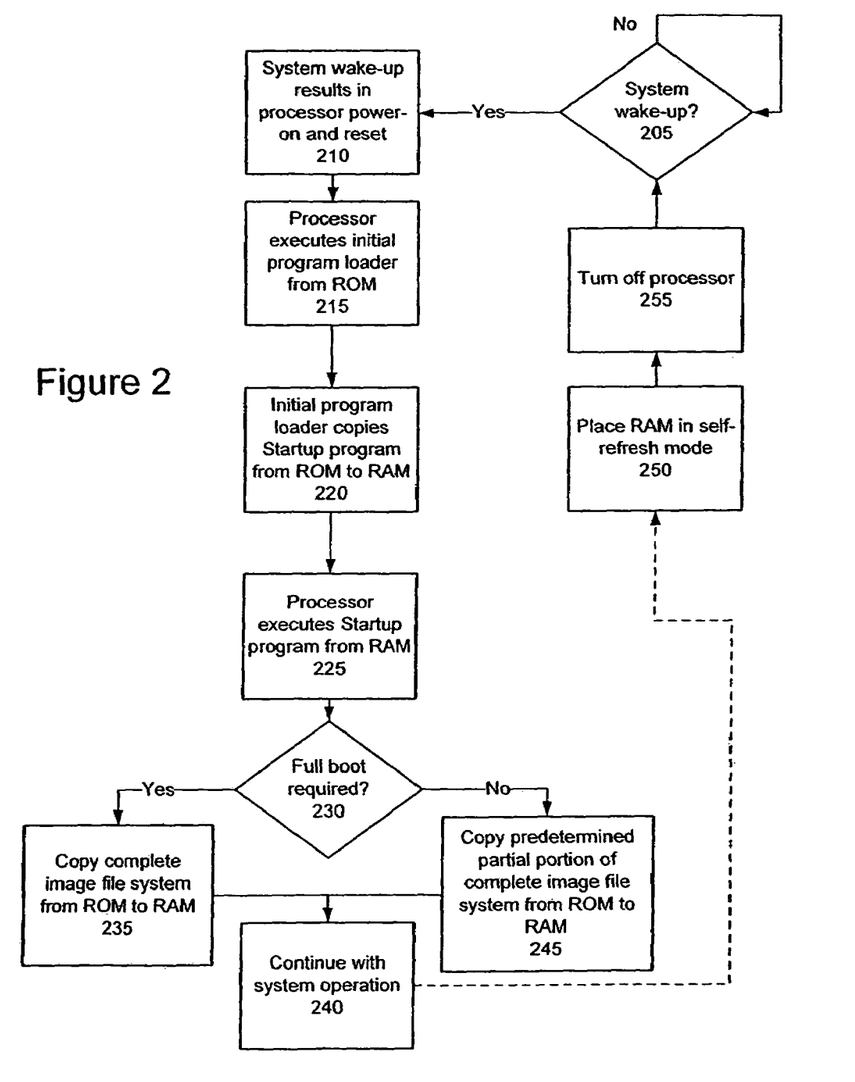
FIG. 2 is a flow diagram illustrating one manner in which the system of FIG. 1 may be operated to implement the fast boot wake-up from the low-power mode and/or system reset.

One manner of operating the system 100 is shown in FIG. 2. In this example, a system wake-up event is detected at block 205. The wake-up event occurs to direct system 100 to exit a low-power mode and enter, for example, a normal operating mode in which all system services are functioning. If power was completely removed from the processor 105 in the low-power mode, operating power is restored at block 210 in response to the wake-up event. Further, the system 100 or, more particularly, power controller 125 responds to the wake-up event by activating the reset signal to cause a processor reset. This reset, in turn, directs processor 105 to begin executing the initial program loader 145 from read only memory 120 at block 215. At block 220, the code of the initial program loader directs the system 100 to copy the startup program 150 from read only memory 120 into random access memory 115. Other functions that may be executed by the initial program loader 145 include configuration of one or more memory controllers, configuration of various clocks used by the system 100, initialization of certain stacks to allow the initial program loader 145 to perform operating system verification and setup, and setup of other minimal configurations of the system hardware needed, for example, during system initialization. Since the initial program loader 145 is executed directly from read only memory 120, it may be implemented, at least in part, as assembly language code. After minimal system initialization, however, the initial program loader 145 may call one or more functions to initiate, for example, a C-language environment. Further, although the initial program loader 145 shown and described in connection with FIGS. 1 and 2 obtains immediate control after the reset, control may pass to the initial program loader 145 from, for example, a system BIOS or the like that is executed in response to the processor reset.

The processor 105 executes the copied startup program 150 from random access memory at block 225. Some of the functions that may be executed by the startup program 150 include hardware initialization, setup of interrupt controllers, initialization of a system page, initialization of system callouts, preparation of the system kernel for execution, and the like.

At block 230, the system 100 determines whether a full boot operation is required, or whether a fast boot operation can be executed. The determination made at block 230 may be implemented in the startup program and/or the initial program loader. In one example, a full boot operation may be required when power is first applied to the system 100 after complete removal of power. In another example, a full boot operation may be required when data and/or code stored in random access memory 115 during a prior full boot operation fails one or more integrity checks.

In each instance in which a full boot operation is required, system control may be transferred to block 235. At block 235, the system 100, through, for example, the initial program loader 145 and/or the startup program 150, executes a complete transfer of the image filesystem 140 from the read only memory 120 to the random access memory 115. Once this copy operation is complete, the system continues at block 240 with its standard system operations. These standard system operations may include execution of a normal mode of operation in which all system services for which the system 100 was designed are functioning.

If the determination at block 230 indicates that a fast boot operation may be executed instead of a full boot operation, system control is transferred to the operations shown at block 245. At block 245, the system 100, through, for example, the initial program loader 145 and/or startup program 150, copies only a predetermined portion of the complete image filesystem 140 from read only memory 120 to the random access memory 115. Since the copying of the files of the image filesystem from read only memory 120 to the random access memory 115 often constitutes a significant time consuming portion of the boot process, the limited copying of the image filesystem that occurs during a fast boot operation may be used to considerably reduce the boot time. This time reduction, in turn, may be used to reduce the overall response time of the system 100 thereby allowing it to meet and/or exceed system response design criterion. Once this copy operation is complete, the system continues at block 240 with its standard system operations. Again, these standard system operations may include execution of a normal mode of operation in which all system services for which the system 100 was designed are functioning.

During the system operations represented by block 240, a power-down event may occur that directs the system 100 to enter the low-power mode of operation. In the example of FIG. 2, system 100 responds to the power-down event at block 250 by placing random access memory 115 in, for example, a self-refresh mode or the like in which the content of the random access memory 115 is maintained for the duration in which the system is in the low-power mode. The power consumed by the random access memory 115 while in this data retention mode may be less than the power that it consumes during the normal system operations shown at block 240. This is the case when random access memory 115 is implemented with, for example, SDRAM technology having a self-refresh, low-power mode of operation.

Entry into the low-power mode of operation may be completed at block 255, where, for example, the processor 105 may be fully powered down. When powered down in this manner, all electrical power to the processor 105 may be removed and the processor 105 does not draw any power. Since the processor 105 often constitutes the device with the largest power consumption in the system 100, even in a hibernation mode, complete power down of the processor 105 in the low-power mode of operation may be used to meet the power consumption constraints imposed on the system design. However, alternative low-power processor modes of operation may be used at block 255 to complete entry into the low-power mode of operation.

Further benefits may be realized when the power consumption in the data maintenance mode of the random access memory 115 during the low-power mode is lower than its power consumption during normal system operations. The power consumption of both the processor 105 and the random access memory 115 in the low-power mode is reduced in such instances resulting in a total lower power consumption value for this mode. After the operations at block 255 are completed, the system 100 remains in the low-power mode until a system wake-up event is detected at block 205. When a wake-up event is detected, the foregoing operations shown in FIG. 2 are repeated.

Figure 3:
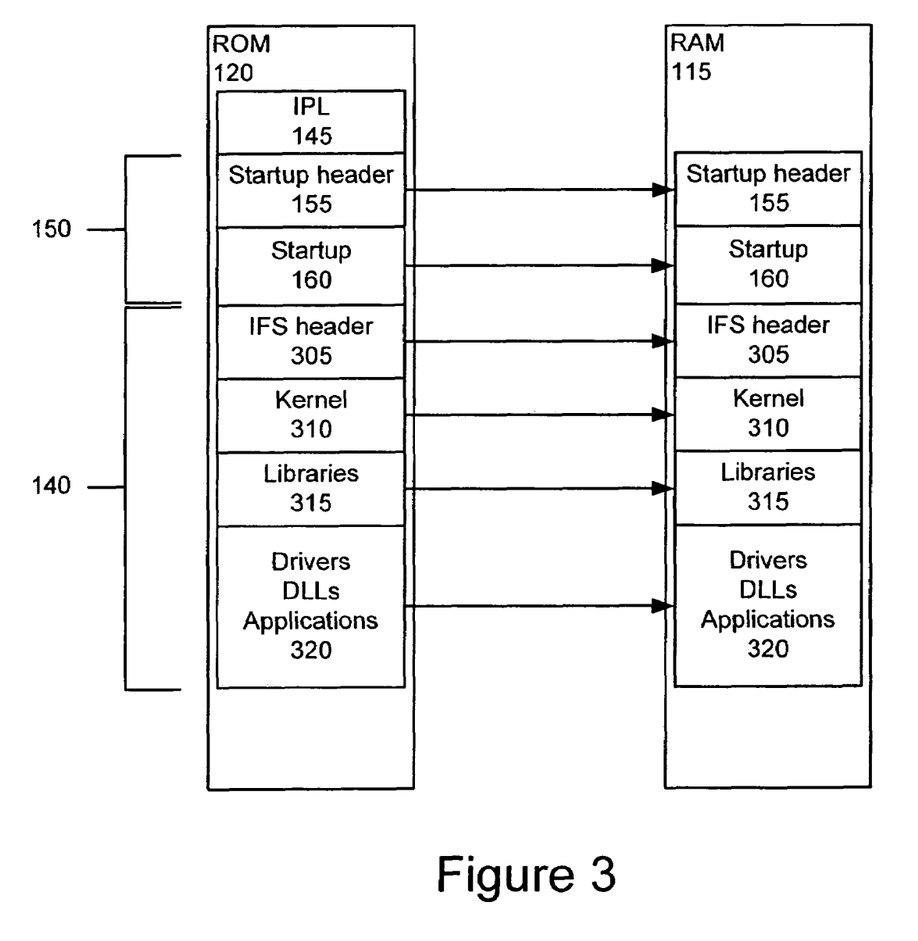
FIG. 3 is a diagram showing one manner of executing a full boot copy operation in the system of FIG. 1.

FIG. 3 illustrates the transfer executed by the system 100 during a full boot copy operation. As shown, the initial program loader 145 is executed by the processor from the read only memory 120 and results in a transfer of the startup program 150 from the read only memory 120 to the random access memory 115. This copy operation is indicated by the arrows proceeding from the read only memory 120 to the random access memory 115. The startup program 150 may include a startup header 155 and startup code 160. Additionally, the entire content of image filesystem 140 is copied from the read only memory 120 to the random access memory 115. The image filesystem 140 shown in FIGS. 1 and 3 includes an image filesystem header 305, a system kernel 310, libraries 315 (such as a C-language library), drivers, dynamic link libraries, and applications (collectively designated at 320). Although FIG. 3 illustrates operation of the system 100 for linearly mapped images, the system 100 may likewise employ bank-switched images where the various portions of the image filesystem are obtained from different memory devices and/or non-contiguous sections of read only memory 120 and/or are copied to different memory devices and/or non-contiguous sections of random access memory 115.

Figure 4:
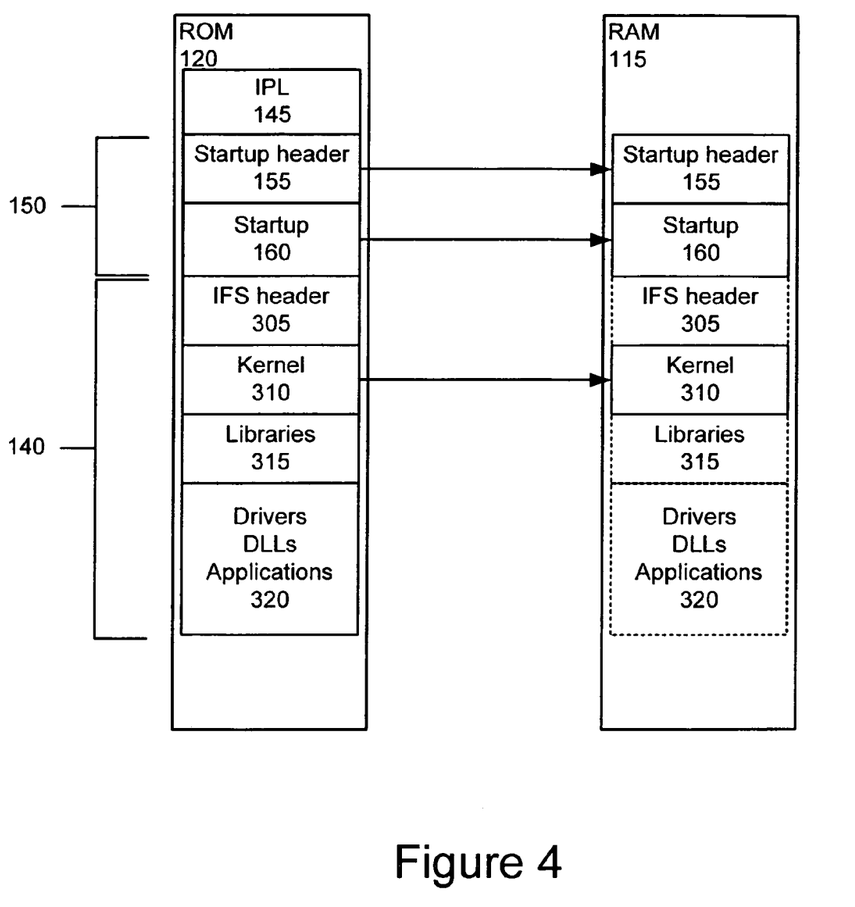
FIG. 4 is a diagram showing one manner of executing a fast boot copy operation in the system of FIG. 1.

FIG. 4 illustrates the transfer executed by the system 100 during a fast boot copy operation. Again, the initial program loader 145 is executed by the processor 105 from the read only memory 120 and results in a transfer of the startup program 150 from the read only memory 120 to the random access memory 115. This operation is indicated by the arrows proceeding from the read only memory 120 to the random access memory 115. In this example, the only portion of image filesystem 140 that is copied to the random access memory 115 is the kernel 310. To further optimize the transfer, copying of the kernel 310 may be limited to a subset of the overall kernel program. For example, copying of the kernel 310 may be limited to an executable binary data segment, or the like. Based on a partial or complete verification of the integrity of header 305, libraries 315, as well as the drivers, dynamic link libraries, and applications of section 320, it is determined that the data and code copied during a prior full boot copy operation is intact. The integrity may be checked, for example, by executing a partial or complete checksum operation on one or more portions of the existing data and/or code stored in the random access memory 115. Copying of the data and/or code corresponding to these portions of the image filesystem 140 is therefore unnecessary. By limiting the amount of copying that occurs during the wake-up of the system from the low-power mode and/or processor reset event, substantial boot time savings may be achieved.

Figure 5:
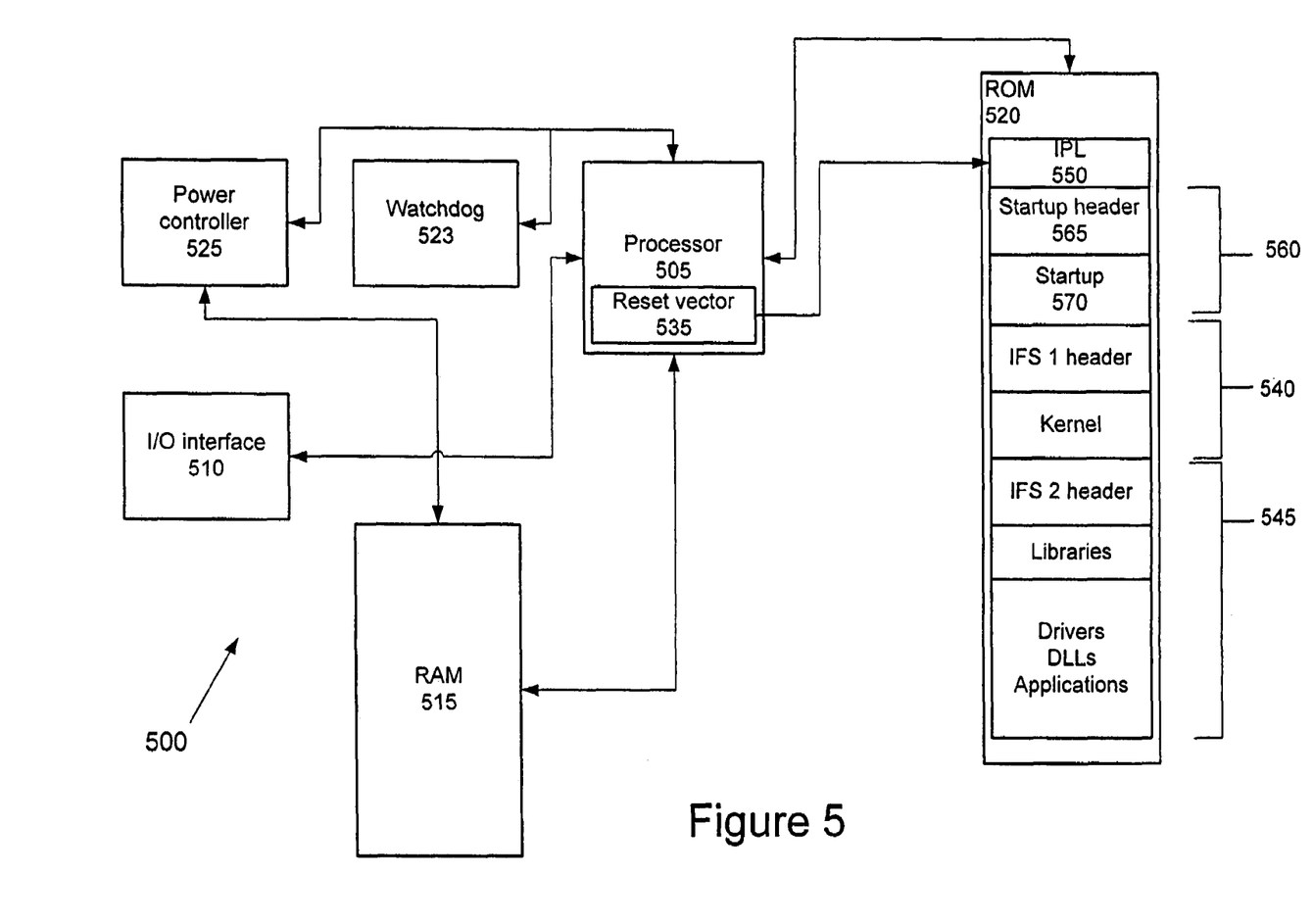
FIG. 5 is a block diagram of the basic components of a further exemplary system that may be used to implement a fast boot wake-up from a low-power mode and/or system reset.

FIG. 5 is a block diagram of the basic components of a further exemplary system that may be used to implement a fast boot wake-up from a low-power mode and/or processor reset event. The system 500 includes a processor 505 that may access an I/O interface 510, random access memory 515, read only memory 520, and a watchdog timer 523. The I/O interface 510 allows the processor 505 to interact with one or more peripheral components. The peripheral components may be separate from and/or integrated with the components of the I/O interface 510. Random access memory 515 may be implemented in a variety of different manners including, for example, implementations using one or more dynamic random access memory technologies. In one implementation, memory 515 is realized using one or more dynamic random access memory units that may be directed into a low-power, self-refresh mode of operation. Likewise, read only memory 520 may be implemented in a variety of different manners including, for example, implementations using one or more flash memory technologies.

System 500 also includes a power controller 525 that may receive power control commands either directly or indirectly from the processor 505. Additionally, or alternatively, the power controller 525 may receive power control signals from an external source, such as another power supply, a peripheral component, a switch, or the like. The power controller 525 responds to these power commands and/or power control signals to direct the system 500 into a low-power mode and to wake-up from the low-power mode. Additional functionality may be associated with power controller 525 to direct the system 500 through an initial power-up operation. An initial power-up operation takes place when power is provided to the system 500 after the system has been completely turned off. A reset signal is provided from the power controller 525 to the processor 505 along one or more signal lines 530. The reset signal goes to an active state in response to a system wake-up event and, further, may be activated in response to an initial power-up event. Processor 505 responds to the occurrence of the active reset signal by attempting to execute assembly language code that is stored at a memory location identified by reset vector 535.

System 500 employs an operating system that is embodied in plural image filesystems 540 and 545 that are stored in read only memory 520. Although two image filesystems are illustrated, many more may be employed. The image filesystem 540 may constitute the primary image filesystem and contain those portions of the operating system kernel needed to initialize operation the system, while image filesystem 545 may constitute a secondary image filesystem and contain, for example, the executable programs used in the system 100, and/or any data files that might be related to the programs. Each image filesystem 540 and 545 also may contain a small directory structure that identifies the names and positions of the files contained within it for reference by the kernel of the operating system during normal system operation.

In the example shown in FIG. 5, read only memory 520 also includes further program code. More particularly, an initial program loader 550 is provided and has a start location corresponding to the reset vector 535. Additionally, read only memory 520 is used to store startup code 560. The startup code 560 may include a startup header 565 and corresponding program code 570.

Figure 6:
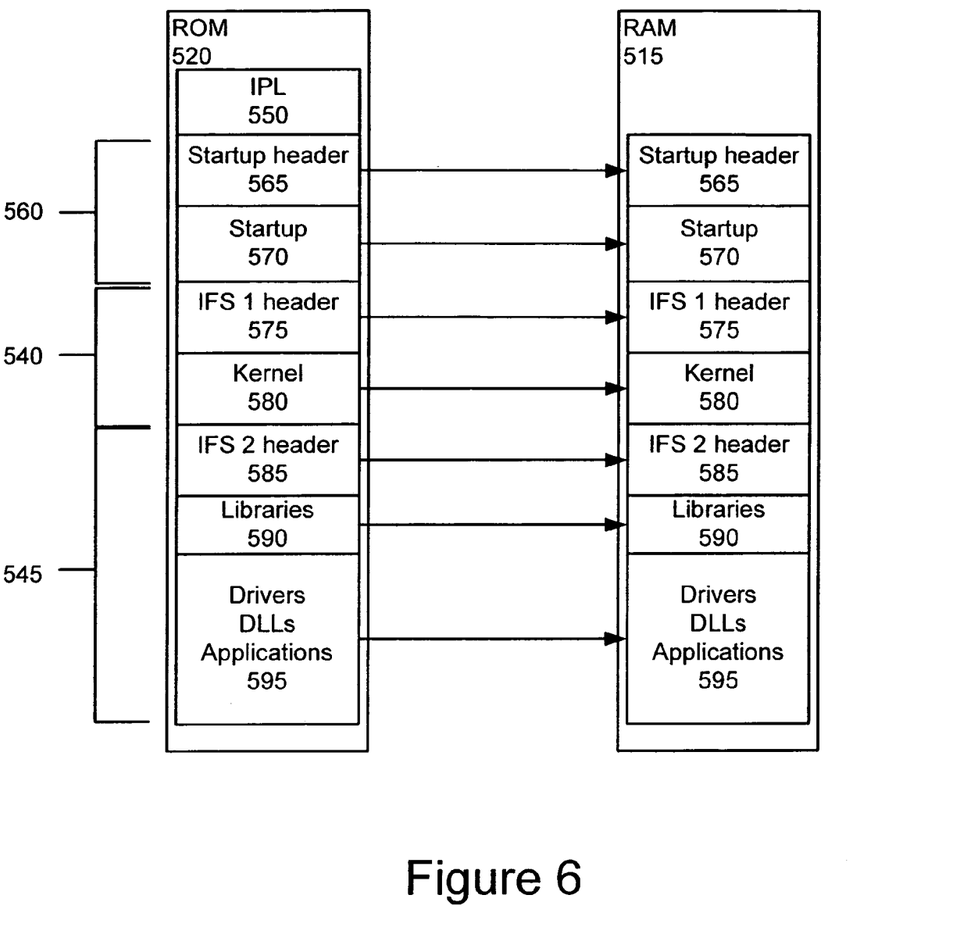
FIG. 6 is a diagram showing one manner of executing a full boot copy operation in the system of FIG. 5.

FIG. 6 illustrates the transfer executed by the system 500 during a full boot copy operation. In this operation, the initial program loader 550 is executed by the processor 505 from the read only memory 520 and results in a transfer of the startup program 560 from the read only memory 520 to the random access memory 515. This copy operation is indicated by the arrows proceeding from the read only memory 520 to the random access memory 515. The startup program 560 may include a startup header 565 and startup code 570. Additionally, the entire content of both image filesystems 540 and 545 are copied from the read only memory 520 to the random access memory 515. Image filesystem 540 shown in FIGS. 5 and 6 includes a first image filesystem header 575 and a system kernel 580. Image filesystem 545 includes a second image filesystem header 585, libraries 590 (such as a C-language library), drivers, dynamic link libraries, and applications (collectively designated at 595). Although FIG. 6 illustrates operation of the system 100 for linearly mapped images, the system 100 may likewise employ bank-switched images where the various portions of the image filesystem are obtained from different memory devices and/or non-contiguous sections of read only memory 120 and/or are copied to different memory devices and/or non-contiguous sections of random access memory 115.

Figure 7:
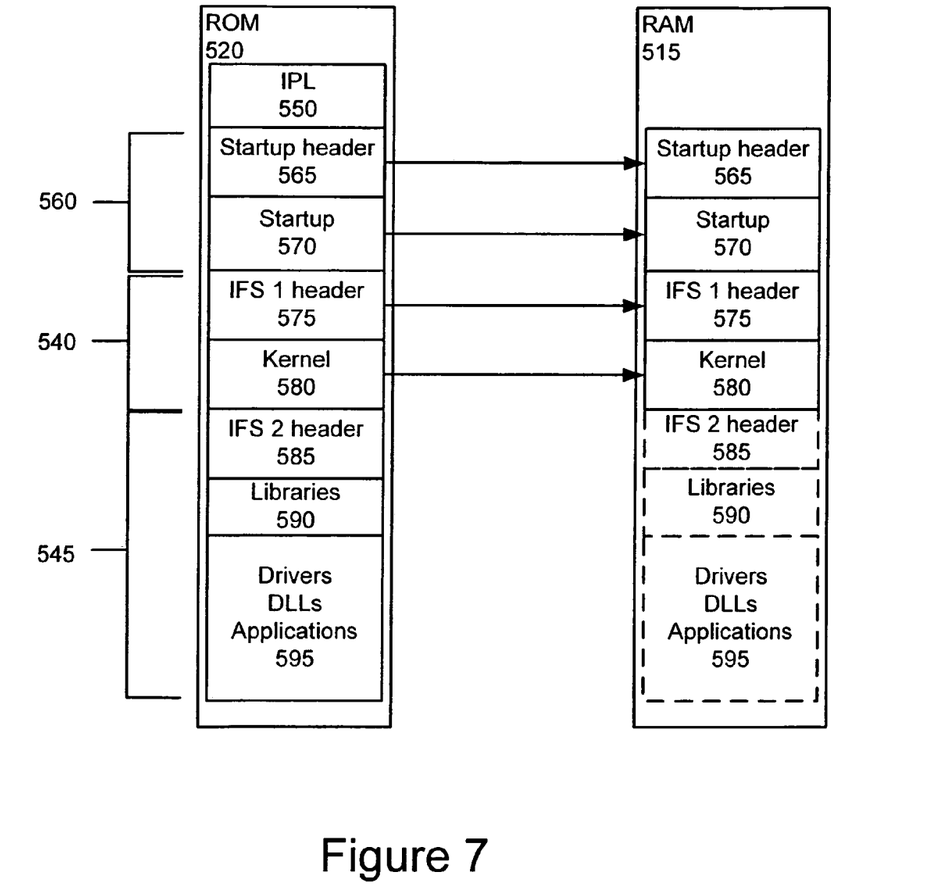
FIG. 7 is a diagram showing one manner of executing a fast boot copy operation in the system of FIG. 5.

FIG. 7 illustrates the transfer executed by the system 500 during a fast boot copy operation. Again, the initial program loader 550 is executed by the processor 505 from the read only memory 520 and results in a transfer of the startup program 560 from the read only memory 520 to the random access memory 515 as indicated by the arrows proceeding from the read only memory 520 to the random access memory 515. In this example, only the primary image filesystem 540 is copied to the random access memory 515. The fast boot copy operation may be further optimized by copying only the data portions of kernel 310. Based on a partial or complete verification of the integrity of all or portions of the secondary image filesystem 545 (i.e., partial or complete verification of the header 585, libraries 590, and/or the drivers, dynamic link libraries, and applications of section 595), it is determined that the secondary image filesystem 545 that was copied from read only memory 520 to the random access memory 515 during a prior full boot copy operation is intact. Copying of the secondary image filesystem 545 is therefore deemed to be unnecessary.

Figure 8:
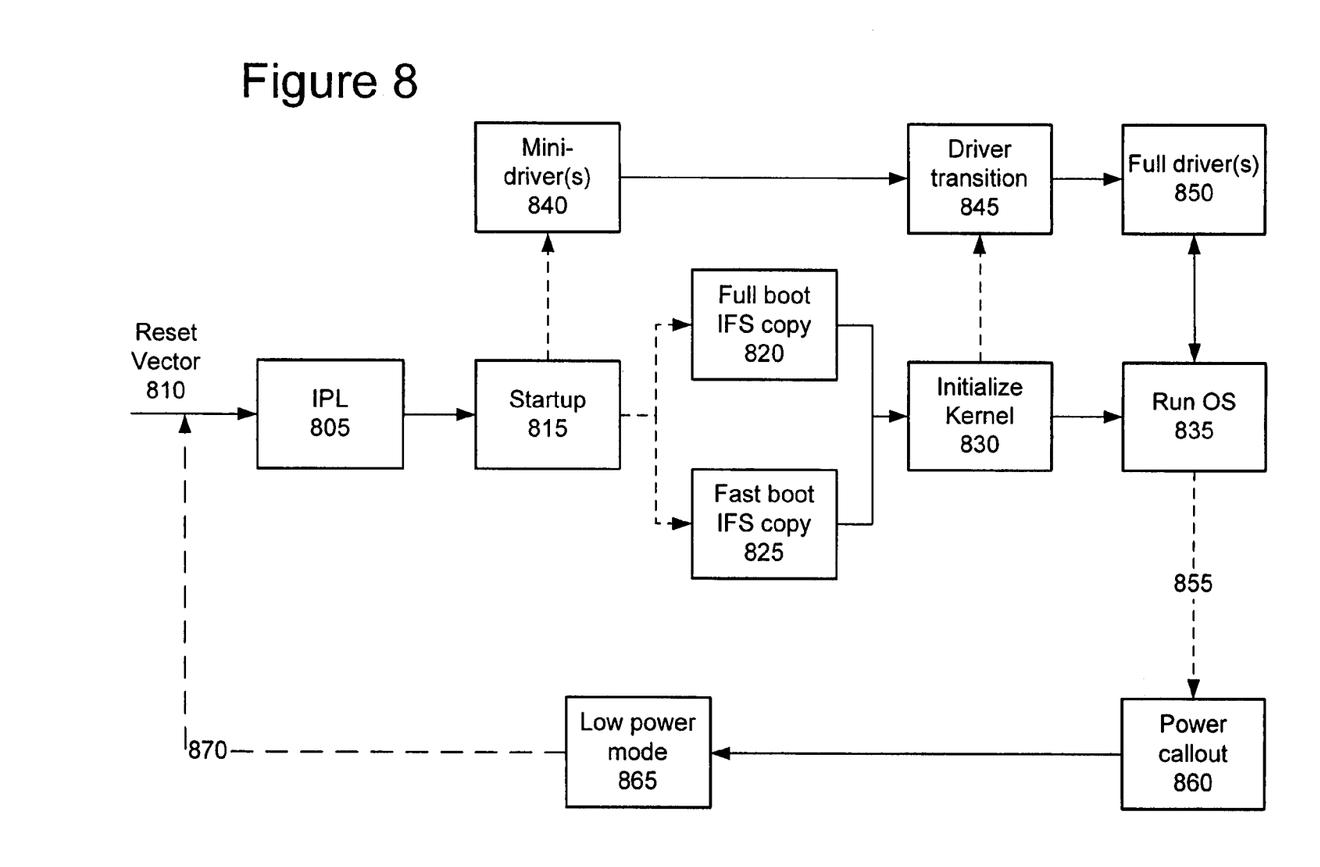
FIG. 8 is a flow diagram illustrating one manner of operating the systems shown in FIGS. 1 and 5 to implement the fast boot wake-up from the low-power mode and/or system reset while concurrently using mini-drivers for control and/or communications with peripheral components and/or other systems.

FIG. 8 illustrates a further manner in which the systems shown in FIGS. 1 and 5 may be operated. In this example, the processor is reset and begins execution of an initial program loader 805 at a location in read only memory that corresponds to the reset vector at 10 of the processor. The initial program loader 805 directs the system to copy the startup program 815 from read only memory to random access memory, where it's is executed by the processor. Based on the criterion set forth above, the system either executes a full boot copy of the image filesystem 820 or a fast boot copy of the image filesystem 825 before initializing the kernel at 830. Once the kernel is initialized, the remaining portions of the operating system, including the various system applications contained in the image filesystem, are initialized and continue to run at 835.

The full versions of the various drivers required by the system to communicate with and control peripheral devices and other systems are typically not available while the system is engaged in a boot operation. Consequently, the ability of the system to deal with its peripheral components and to interact with other systems is relatively limited until the operating system is completely initialized and running. Waiting for the boot operation to complete before interacting with peripheral components and other systems, however, may hamper the ability of the system to meet response time criterion.

One manner of addressing this problem is shown in FIG. 8. More particularly, one or more mini-drivers 840 are loaded and executed by the startup program 815. Each mini-driver is used to temporarily interact and/or communicate with a corresponding peripheral component or system during the boot operation. A mini-driver differs from its corresponding full driver in that the mini-driver may be designed to implement only a subset of the functionality provided by the full driver. Further, a full driver is typically driven by one or more interrupts that are generated by the peripheral component or system with which it is associated, whereas a mini-driver polls the associated peripheral component or system for messages in response to timer interrupts that are initialized by the initial process loader 805 and/or startup program 815. High priority messages received by a mini-driver may be addressed during the boot operation, if necessary. Most messages, however, may be stored in a message queue for limited handling by the corresponding mini-driver or for handling by the corresponding full version of the driver. As the kernel is initialized at 830, the system begins to transition at 845 from using the mini-drivers to using the full drivers. Full versions of the drivers are available at 850 once the operating system is running at 835.

The operating system continues to run at 835 until a power down event 855 occurs. The response of the system to the power down event may be handled by a power manager program that interacts with a power callout 860. The power callout 860 directs the system into a low-power mode 865, where the system remains until the occurrence of a wake-up event 870.

Figure 9:
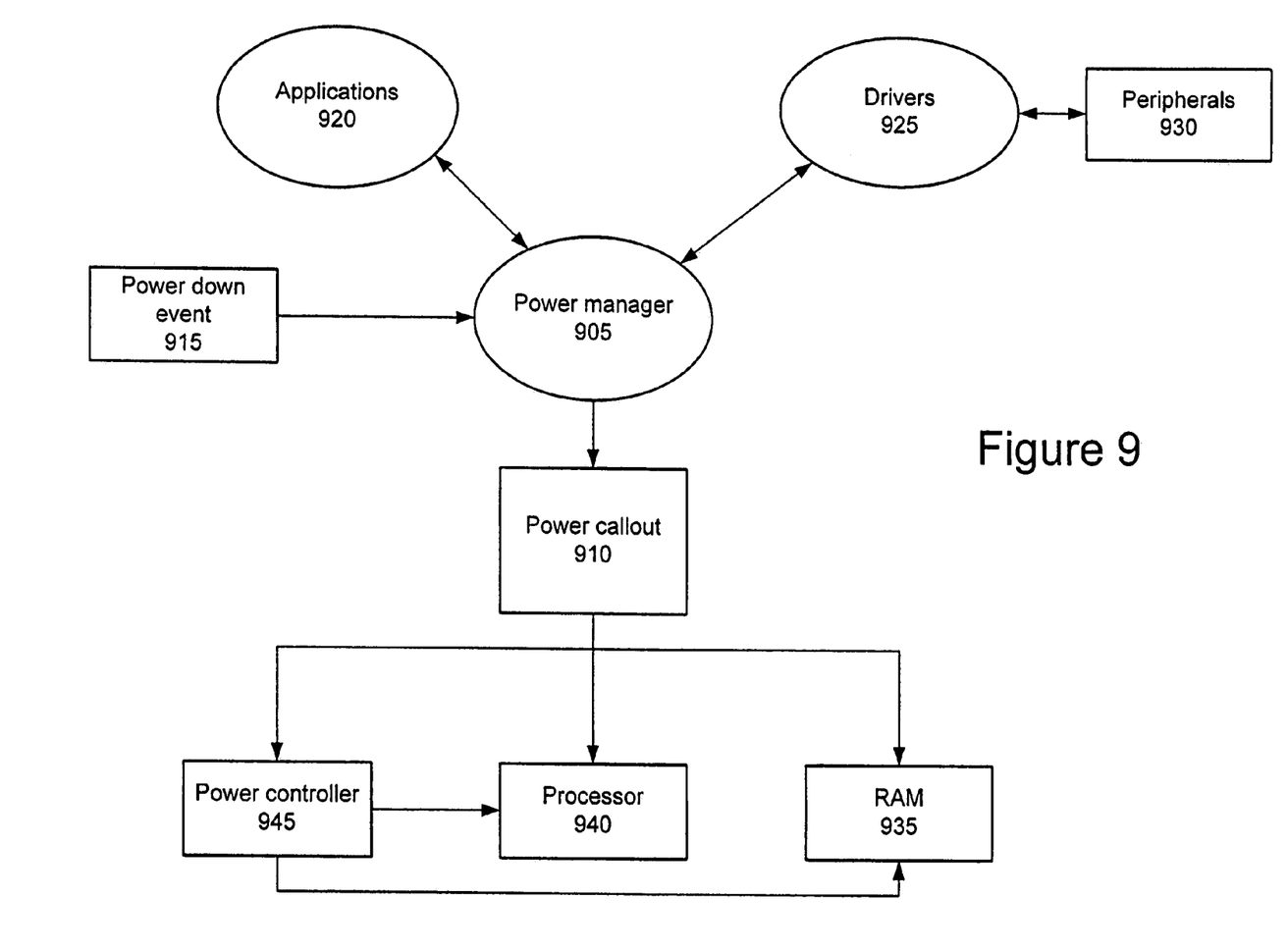
FIG. 9 is a flow diagram illustrating one manner of directing the systems shown in FIGS. 1 and 5 into a low-power mode of operation.

FIG. 9 illustrates one manner in which power manager software 905 may interact with a power callout 910 to transition the system to a low-power mode. In this example, the power manager 905 is used to detect the power down event 915. The power manager 905 responds to the power down event 915 by, for example, notifying the running applications 920 and drivers 925 that a power down event has occurred. The drivers 925 may respond to this notification by storing the state of the corresponding peripherals 930 in, for example, random access memory 935. Applications 920 may take the necessary steps to wrap-up any pending operations before closing.

Power manager software 905 also executes a power callout 910 to the system kernel. The power callout 910, in turn, takes the necessary steps to direct random access memory 935, processor 940, and power controller 945 into the respective states used in the low-power mode. For example, the power callout 910 may direct random access memory 935 into a self-refresh mode before directing power controller 945 to remove operating power from processor 940. Because the power manager 905, applications 920, and drivers 925 are no longer running once operating power is removed from the processor 940, execution of the power callout 910 may be delayed until the power manager 905 determines that the applications 920 and drivers 925 are properly shut down.

In each of the foregoing systems, the integrity of the contents of the random access memory may be checked during the full boot and/or fast boot operation. Additionally, or in the alternative, the integrity of the contents of the random access memory may be checked once a full boot and/or fast boot operation has been completed. As noted above, the integrity check may be in the form of a checksum operation on the entire contents of the random access memory or partial portions of the random access memory. In the event that the system fails the integrity check, the processor may be reset, for example, to subject the system to a full boot operation.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A processing system comprising:
    a processor responsive to a reset signal for directing initial execution of a program at a reset vector;
    self-refreshing random access memory accessible by the processor;
    read only memory storing an operating system image file, an initial program loader beginning at the reset vector, and startup code loaded into the self-refreshing random access memory in response to execution of the initial program loader;
    a power control system responsive to power commands and/or power control signals to direct the system into a low-power mode and to wake-up the system from the low-power mode, where the processor and self-refreshing random access memory are each directed into a low-power consumption state during the low-power mode, and where the power control system generates the reset signal to the processor to direct the system to wake-up from the low-power mode, where the processor and self-refreshing random access memory are directed out of their respective low-power states to an operating power consumption state when the system wakes-up from the low-power mode;
    where either the initial program loader or the startup code selectively performs a full boot copy of the operating system image file from the read only memory to the self-refreshing random access memory in response to an initial power-up of the system, or a fast boot copy of only predetermined portions of the operating system image file from the read only memory to the self-refreshing random access memory when waking-up from the low-power mode.

2. The processing system of claim 1, where the self-refreshing random access memory comprises dynamic random access memory.

3. The processing system of claim 1, where the self-refreshing random access memory comprises dynamic random access memory and where the power control system responds to a power down event, as indicated by the power commands and/or power control signals, to direct the system to enter a low-power mode in which the dynamic random access memory is in a self-refresh mode and power is removed from the processor.

4. The processing system of claim 3, where either the initial program loader or the startup code is executed to perform at least a partial check of the content of the dynamic random access memory as the system exits the low-power mode, and where either the initial program loader or the startup code is executed to use a result of the check to determine whether a full boot copy operation or a fast boot copy operation is executed.

5. The processing system of claim 1, where either the initial program loader or the startup code is executed to perform at least a partial check of the contents of the self-refreshing random access memory to select whether the full boot copy operation or the fast boot copy operation will be executed.

6. The processing system of claim 1, where either the initial program loader or the startup code is executed to perform a checksum operation on at least a portion of the contents of the random access memory to select whether the full boot copy operation or the fast boot copy operation is executed.

7. The processing system of claim 6, where the checksum operation is performed on the data structure of data stored in the random access memory.

8. The processing system of claim 1, where the operating system image file comprises at least two image filesystems including a primary image filesystem and a secondary image filesystem.

9. The processing system of claim 8, where both the primary image filesystem and the secondary image filesystem are copied from the read only memory to the self-refreshing random access memory when the startup code is executed to perform a full boot copy, and where only the primary image filesystem of the primary and secondary image filesystems is copied from the read only memory to the self-refreshing random access memory when the startup program is executed to perform a fast boot copy.

10. The processing system of claim 1, where the operating system image file comprises:
    a kernel pro gram;
    a further program selected from the group consisting of a peripheral driver, a dynamic link library, and a system application.

11. The processing system of claim 10, where the further program and the kernel program are copied from the read only memory to the self-refreshing random access memory when the startup code is executed to perform a full boot copy, and where the startup code is executed to perform a fast boot copy by copying at least a portion of the kernel program from the read only memory to the self-refreshing random access memory without copying the further program from the read only memory to the random access memory.

12. A processing system comprising:
a processor responsive to a reset signal for directing initial execution of a program at a reset vector;
read only memory storing an operating system image file accessible by the processor;
dynamic random access memory accessible by the processor;
a power control system responsive to a power down event to direct the system to enter a low-power mode in which the dynamic random access memory is in a self-refresh mode and the processor is powered off, and where the power control system is further responsive to a wake-up event as well as to an initial power up event to direct the system to reset the processor by generating the reset signal, where the dynamic random access memory and processor are directed to operational power consumption states in response to the wake-up event;
a boot program, beginning at the reset vector, that is executable by the processor to initialize the processing system when the dynamic random access memory and processor are in their operational power consumption states, where the boot program performs a full boot copy of the operating system image file from the read only memory to the dynamic random access memory in response to the initial power-up of the system, and where the boot program performs a fast boot copy of only predetermined portions of the operating system image file from the read only memory to the dynamic random access memory when the system exits the low-power mode in response to one or more predetermined conditions.

13. The processing system of claim 12, where the boot program is executed to perform at least a partial check of the contents of the dynamic random access memory when the system exits the low-power mode, and where the boot program uses a result of the check as the one or more predetermined conditions.

14. The processing system of claim 13, where a checksum operation is performed on the data structure of data stored in the dynamic random access memory.

15. The processing system of claim 12, where the operating system image file comprises at least two image filesystems including a primary image filesystem and a secondary image filesystem.

16. The processing system of claim 15, where both the primary image filesystem and the secondary image filesystem are copied from the read only memory to the dynamic random access memory when the boot program is executed to perform the full boot copy, and where only the primary image filesystem of the primary and secondary image filesystems is copied from the read only memory to the dynamic random access memory when the boot program is executed to perform the fast boot copy.

17. The processing system of claim 12, where the operating system image file comprises:
a kernel program;
a further program selected from the group consisting of a peripheral driver, a dynamic link library, and a system application.

18. The processing system of claim 17, where the further program and the kernel program are copied from the read only memory to the dynamic random access memory when the boot program is executed to perform a full boot copy, and where the boot program is executed to perform a fast boot copy by copying at least a portion of the kernel program from the read only memory to the dynamic random access memory without copying the further program from the read only memory to the dynamic random access memory.

* * * * *

UNITED STATES PATENT AND TRADEMARK OFFICE
CERTIFICATE OF CORRECTION

PATENT NO. : 7,624,260 B2  Page 1 of 1
APPLICATION NO. : 11/418481
DATED : November 24, 2009
INVENTOR(S) : Ethier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 814 days.

Signed and Sealed this

Twenty-sixth Day of October, 2010

David J. Kappos
*Director of the United States Patent and Trademark Office*